United States Patent
Ning et al.

(10) Patent No.: US 7,240,141 B2
(45) Date of Patent: Jul. 3, 2007

(54) PROGRAMMABLE INTER-VIRTUAL CHANNEL AND INTRA-VIRTUAL CHANNEL INSTRUCTIONS ISSUING RULES FOR AN I/O BUS OF A SYSTEM-ON-A-CHIP PROCESSOR

(75) Inventors: Chun Hung Ning, Millbrae, CA (US); Laurent Rene Moll, Saratoga, CA (US); Kwong-Tak Chui, Cupertino, CA (US); Shun Wai Go, San Jose, CA (US); Piyush Shashikant Jamkhandi, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 166 days.

(21) Appl. No.: 10/821,397

(22) Filed: Apr. 9, 2004

(65) Prior Publication Data

US 2005/0228930 A1    Oct. 13, 2005

(51) Int. Cl.
G06F 13/366 (2006.01)
(52) U.S. Cl. ...................... 710/309; 710/315
(58) Field of Classification Search ............... 710/315
See application file for complete search history.

(56) References Cited

U.S. PATENT DOCUMENTS 5,260,935 A * 11/1993 Turner ..................... 370/394

(Continued)

FOREIGN PATENT DOCUMENTS

EP          1117049 A1 *   7/2001

(Continued)

OTHER PUBLICATIONS

D. Linder et al., "An Adaptive and Fault Tolerant Wormhole Routing Strategy for $k$-ary $n$-cubes," IEEE Transactions on Computers, vol. 40, No. 1, Jan. 1991, 11 pages.

(Continued)

*Primary Examiner*—Paul R. Myers
(74) *Attorney, Agent, or Firm*—Garlick Harrison & Markison; Bruce E. Garlick

(57) ABSTRACT

A method and apparatus for programming instruction issuing rules for instructions residing among various virtual channels, as well as the same virtual channel of an I/O bus interface for a system-on-a-chip processor. In the method and apparatus of the present invention both intra-virtual channel dependencies and inter-virtual channel dependencies are fully programmable, thereby offering significant advantages over prior art I/O interfaces. The method and apparatus of the present invention is broadly comprised of a system for managing data transactions between a first bus and a second bus. A first transaction conversion module is operably connected to the first bus and is operable to receive transactions from the first bus and a first format and to convert those transactions into an internal format. An ordering rules logic module is operably connected to the first transaction conversion module and is further operable to control issuing of transactions in accordance with a dependency relationship between the individual transactions. The ordering rules logic module generates validated transactions that are provided to a second conversion transaction module which is operably connected to the second bus. The ordering rules logic module of the present invention is fully programmable and, therefore, does not need to be redesigned when the data processing system is adapted to operate on a new bus system.

10 Claims, 5 Drawing Sheets

U.S. PATENT DOCUMENTS

| | | | | |
|---|---|---|---|---|
| 5,659,798 | A | * | 8/1997 | Blumrich et al. ............. 710/26 |
| 5,784,357 | A | * | 7/1998 | Wolker et al. .............. 370/218 |
| 5,901,299 | A | * | 5/1999 | Arimilli et al. ............ 710/315 |
| 5,905,873 | A | * | 5/1999 | Hartmann et al. .......... 709/249 |
| 5,995,923 | A | * | 11/1999 | Mermelstein et al. ....... 704/219 |
| 5,999,198 | A | * | 12/1999 | Horan et al. ................ 345/531 |
| 6,240,492 | B1 | * | 5/2001 | Foster et al. ................ 711/149 |
| 6,681,274 | B2 | * | 1/2004 | Ennis ........................... 710/52 |
| 6,725,297 | B1 | * | 4/2004 | Askar et al. .................. 710/52 |
| 6,862,647 | B1 | * | 3/2005 | Hewitt ....................... 710/313 |
| 7,096,310 | B2 | * | 8/2006 | Norden ....................... 710/317 |
| 2003/0217239 | A1 | * | 11/2003 | Jeddeloh .................... 711/158 |
| 2004/0066758 | A1 | | 4/2004 | Van Doren et al. ......... 370/329 |
| 2004/0068616 | A1 | | 4/2004 | Tierney et al. .............. 711/141 |
| 2005/0038948 | A1 | * | 2/2005 | Lueck et al. ................ 710/315 |

FOREIGN PATENT DOCUMENTS

| | | | |
|---|---|---|---|
| EP | 1555816 A1 | * | 7/2005 |
| JP | 10040087 A | * | 2/1998 |

OTHER PUBLICATIONS

W. Dally et al., "Deadlock-Free Adaptive Routing in Multicomputer Networks Using Virtual Channels," IEEE Transactions on Parallel and Distributed Systems, vol. 4, No. 4, Apr. 1993, 10 pages.

J. Duato, "A Theory of Deadlock-Free Adaptive Multicast Routing in Wormhole Networks," IEEE Transactions on Parallel and Distributed Systems, vol. 6, No. 9, Sep. 1995, 12 pages.

* cited by examiner

|  | VC1 | VC2 | ... | VCn |
|---|---|---|---|---|
| VC1 | @ | Yes | ... |  |
| VC2 |  | @ | ... |  |
| ... | ... | ... | ... | ... |
| VCn | Yes | Yes | ... | @ |

*Figure 4*

|  | Posted transaction | Non-posted transaction | Response |
|---|---|---|---|
| Posted transaction |  |  |  |
| Non-posted transaction | Yes (A) |  |  |
| Response | Yes (B) |  |  |

*Figure 5*

|  | C1 | C2 | ... | Cn |
|---|---|---|---|---|
| C1 |  |  |  |  |
| C2 |  |  |  | Yes |
| ... |  |  |  |  |
| Cn |  |  |  |  |

*Figure 6*

|  | IO command from CPU | Memory command from CPU | Memory command from Non-CPU |
|---|---|---|---|
| IO Command from CPU | Yes |  |  |
| Memory command from CPU |  |  |  |
| Memory command from Non-CPU |  |  |  |

*Figure 7*

PROGRAMMABLE INTER-VIRTUAL CHANNEL AND INTRA-VIRTUAL CHANNEL INSTRUCTIONS ISSUING RULES FOR AN I/O BUS OF A SYSTEM-ON-A-CHIP PROCESSOR

CROSS-REFERENCE TO RELATED APPLICATIONS

This application is related to U.S. patent application Ser. No. 10/434,921, filed May 9, 2003, entitled "Ambiguous Virtual Channels" by inventor Joseph B. Rowlands, and U.S. patent application Ser. No. 10/685,376, filed Oct. 14, 2003, entitled "Switch Operation Scheduling with Concurrent Connection and Queue Scheduling" by inventor Laurent Moll, and U.S. patent application Ser. No. 10/356,661, filed Jan. 31, 2003, entitled "Packet Data Service Over Hypertransport Links," by inventors Manu Gulati, Laurent Moll and Barton Sano, each of the foregoing applications is hereby incorporated by reference in its entirety.

BACKGROUND OF THE INVENTION

1. Field of the Invention

The present invention is directed in general to data communications. More specifically, the present invention provides an improved method and apparatus for controlling the transfer of information between various buses in high speed data processing systems.

2. Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, USB (universal serial bus), and SPI (system packet interface). One relatively new communication technology for coupling relatively small groups of devices is the HyperTransport (HT) technology, previously known as the Lightning Data Transport technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

Many programming tasks, especially those that control peripheral devices require specific events to occur in a specific order. If the events generated by the program do not occur in the hardware in the order intended by the software, a peripheral device may behave in an unexpected way. Ordering or dependency rules are necessary for the correct operation of an IO bus system. However, ordering rules for one IO bus standard may not be compatible with those for another bus. Designing for a new IO bus interface for a System-On-a-Chip processor often involves re-design of the ordering rules logic section for the bus interface. There is a need, therefore, for an improved bus interface system that provides rule ordering logic that is programmable and, therefore, does not need to be redesigned when the interface is adapted to a new bus system.

SUMMARY OF THE INVENTION

The present invention provides a method and apparatus for programming the instruction issuing rules for instructions residing among various virtual channels, as well as the same virtual channel of an I/O bus interface for a system-on-a-chip processor. In the method and apparatus of the present invention, both intra-virtual channel dependencies and inter-virtual channel dependencies are fully programmable, thereby offering significant advantages over prior art I/O interfaces.

The method and apparatus of the present invention is broadly comprised of a system for managing data transactions between a first bus and a second bus. A first transaction conversion module is operably connected to the first bus and is operable to receive transactions from the first bus and a first format and to convert those transactions into an internal format. An ordering rules logic module is operably connected to the first transaction conversion module and is further operable to control issuing of transactions in accordance with a dependency relationship between the individual transactions. The ordering rules logic module generates validated transactions that are provided to a second conversion transaction module which is operably connected to the second bus. The ordering rules logic module of the present invention is programmable and, therefore, does not need to be redesigned when the data processing system is adapted to operate on a new bus system.

The present invention can be implemented in various embodiments for instructions residing within the same virtual channel of a data processing system. In one embodiment of the present invention, instructions residing in the same virtual channel are issued serially in a first-in, first-out (FIFO) manner and a new instruction will not be issued until the previous instruction has been completed. In another embodiment, instructions residing in the same virtual channel are issued in a random manner with multiple outstanding concurrent instructions to minimize latency and to maximize performance. In yet another embodiment, the instructions residing in the same virtual channel are issued serially in a FIFO manner for instructions originating from a first source, and concurrently for instructions originating from a second source. In yet another embodiment, the instructions residing in the same virtual channel are issued serially in a FIFO manner for a first set of instructions originating from a first source and in a concurrent manner for a second set of instructions originating from said first source.

In the various embodiments of the present invention, instructions residing among the various virtual channels can be issued concurrently or can be issued in accordance with industry-standard ordering rules. The method and apparatus of the present invention can support numerous programming models and can be modified "on the fly." Therefore, it can significantly enhance the performance of an I/O bus system by minimizing latencies and maximizing bandwidth. The programmed rules provided by the present invention can be backward compatible and also have the flexibility for use in future configurations of data processing systems.

BRIEF DESCRIPTION OF THE DRAWINGS

FIG. 4 is an illustration of an inter-virtual channel transaction dependency matrix.

FIG. 5 is an example of an implementation of a dependency relationship for inter-virtual channels of a PCI bus.

FIG. 6 is an illustration of an intra-virtual channel transaction dependency matrix.

FIG. 7 is an illustration of an embodiment of a dependency matrix illustrating the dependency relationship within the non-posted virtual channel of a PCI transaction.

DETAILED DESCRIPTION

Figure 1:
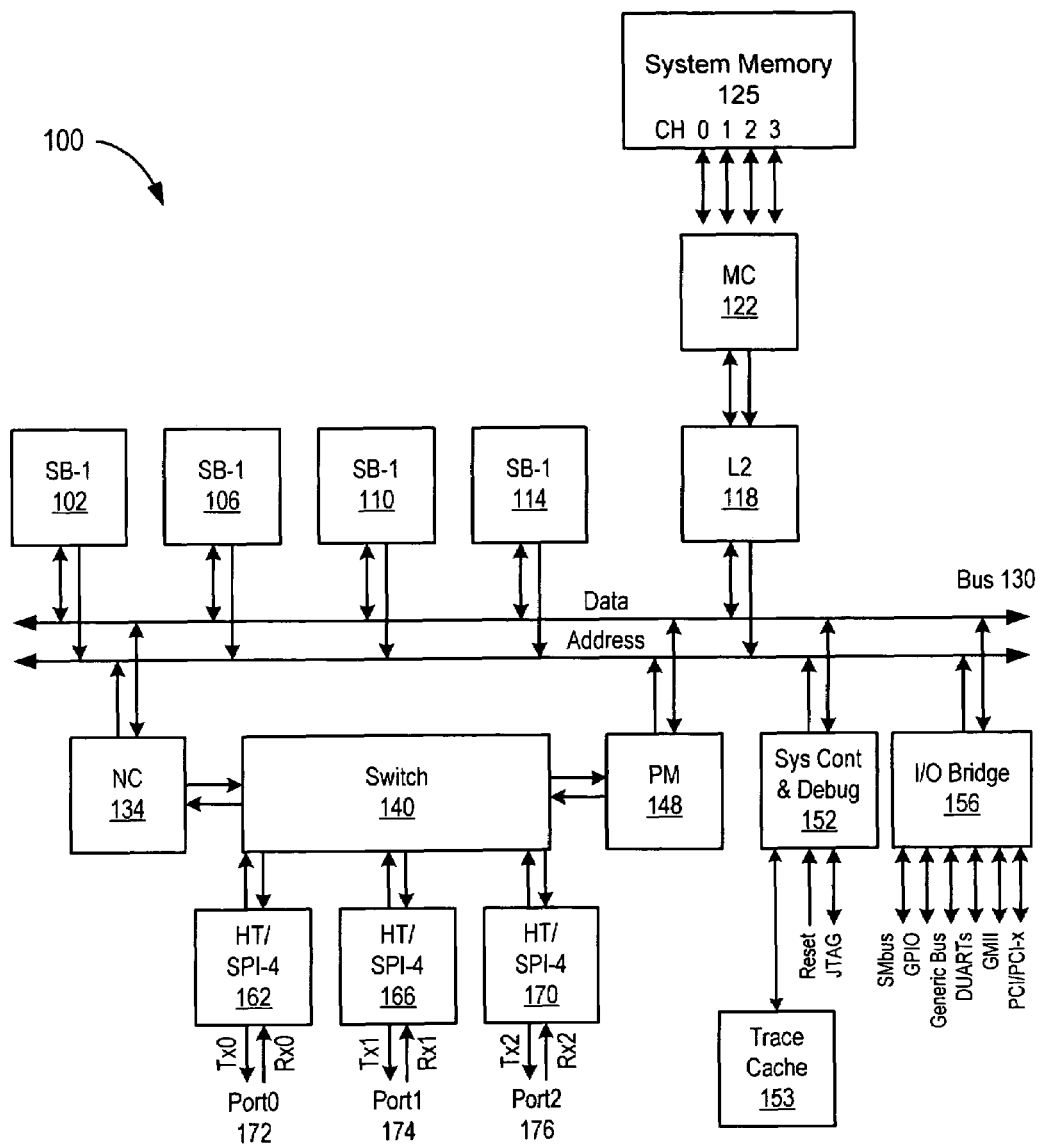
FIG. 1 shows a block diagram of a network multiprocessor switching system-on-a-chip.

A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152, an I/O Bridge 156 which interfaces the system bus with various system interfaces, and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including the input/output bridge interface 156 for the generic bus, SMbus, UARTs, GPIO, Ethernet MAC and PCI/PCI-X interface. The cache memory 118 may function as an L2 cache for the processing units 102, 106, 110, 114, node controller 134 and/or packet manager 148.

The memory controller 122 provides an interface to system memory, which, when the multiprocessor device 100 is an integrated circuit, may be off-chip and/or on-chip. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three HyperTransport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, node controller 134, system bus 130 and the packet interface circuits 162, 166, 170 may be tightly coupled to receive, process, and forward data (if necessary).

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are, 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

In the system of the present invention, configuration space registers pertaining to all functions (headers) and capability blocks implemented by the system are controlled by the node controller 134. The node controller 134 either has a copy of the registers or the access to a register is routed through node controller in a serial manner. In either of these cases, reads and writes to configuration spaces throughout the various system components pass through the node controller 134. The node controller 134 operates in conjunction with the configuration space register to enforce ordering rules, as described in greater detail hereinbelow. In an embodiment of the present invention the independent flow characteristics of the virtual channels are modified by the operation of the I/O bridge 156 and the configuration status register 198 to coordinate transactions between multiple bridges in accordance with the dependency relationships discussed hereinbelow.

Additional peripheral features of the system include an input/output bridge 156 that includes a 10/100/1000 Ethernet MAC interface, general-purpose I/O ports, SMBus serial interfaces, four DUARTs and a 32-bit 33/66-MHz PCI or 64-bit 133 MHz PCI-X interface. The input/ouput bridge 156, operating in conjunction with bus format conversion modules and rules ordering logic described in greater detail hereinbelow, is operable to facilitate the transfer of transactions between the bus 130 and other buses, such as PCI and PCI-X buses.

As was discussed above, ordering or dependency rules are necessary for the correct operation of an IO bus system. However, ordering rules for one bus standard may not be compatible with those for another bus. For example, the ordering rules for the bus 130 discussed hereinabove, may not be compatible with the ordering rules for the PCI and PCI-X buses serviced by the input/output bridge 156. It is necessary, therefore, to convert the transaction from the format of the first bus to the format required by the second bus and also to implement and enforce ordering rules to govern the transfer of transactions between the two buses.

Figure 2:
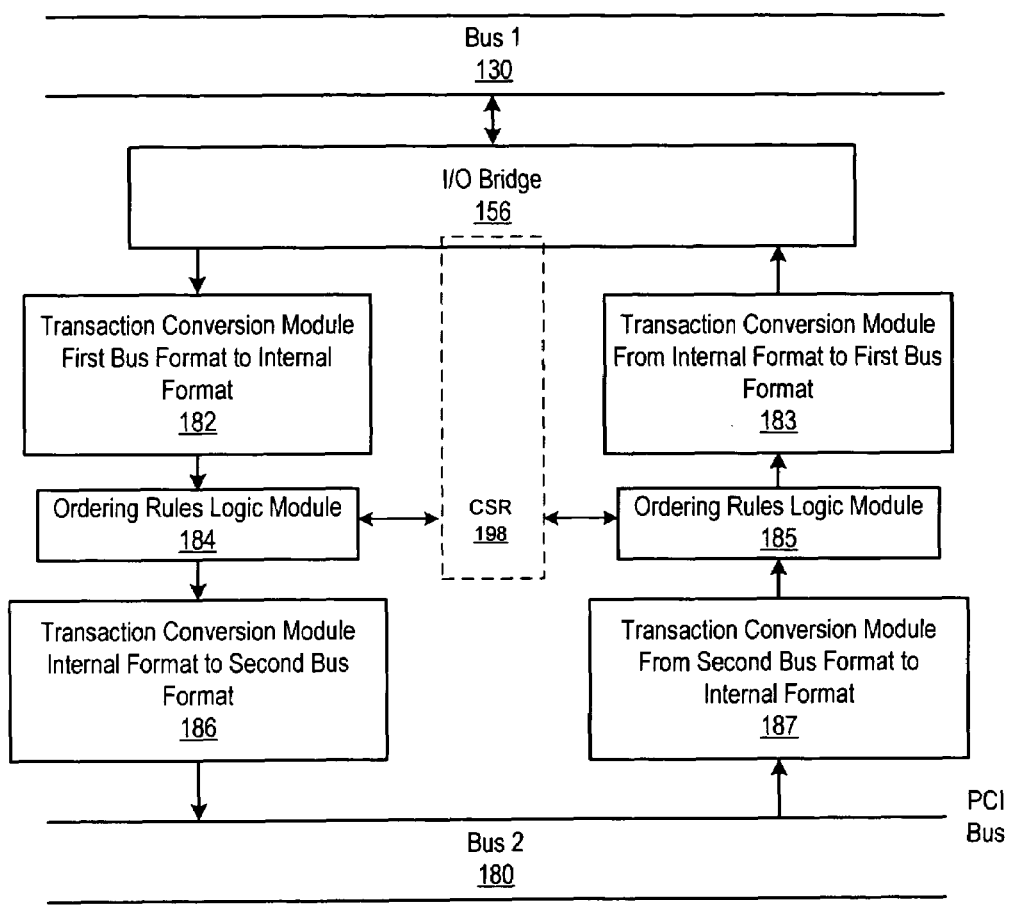
FIG. 2 is a block diagram illustrating the functional modules for controlling the flow of a transaction from a first bus to a second bus.

FIG. 2 is a block diagram illustrating the functional modules for controlling the flow of a transaction from a first bus 130 to a second bus 180. A transaction originating on the first bus 130 is converted by transaction conversion module 182 from the format for bus 130 to an internal format. The ordering rules logic module 184 is operable to receive the converted transactions and to control the validation and issuing of those transactions as described more fully hereinbelow. Transactions issued from the ordering rules logic module 186 are then converted in transaction conversion module 186 from the internal format to a format that is compatible with the second bus 180.

Transactions originating on the second bus 180 are first converted by transaction conversion module 187 from the second bus format to an internal format. The converted transactions are then received by the ordering rules logic module 185 which is operable to control the validation and issuing of transactions as described in more detail hereinbelow. Transactions issued from the ordering rule logic module 185 are received by transaction conversion module 183 which is operable to convert the transactions into a format compatible with bus 130.

In prior art data processing systems, implementation of a new input/output bus interface required redesign of the ordering rules logic module to implement the transfer of transactions from a first bus to a second bus. As will be discussed in greater detail below, the method and apparatus of the present invention provides a programmable solution for implementation of the ordering rules logic module 184, thereby reducing or eliminating the need for redesign of this module when adapting the input/output bus interface to a new bus system. In one embodiment of the present invention, the second bus 180 comprises a PCI bus operating in accordance with ordering rules and rules for management of transactions described in Appendix E of the PCI local bus specification revision 2.3, which by this reference is incorporated herein for all purposes.

Figure 3:
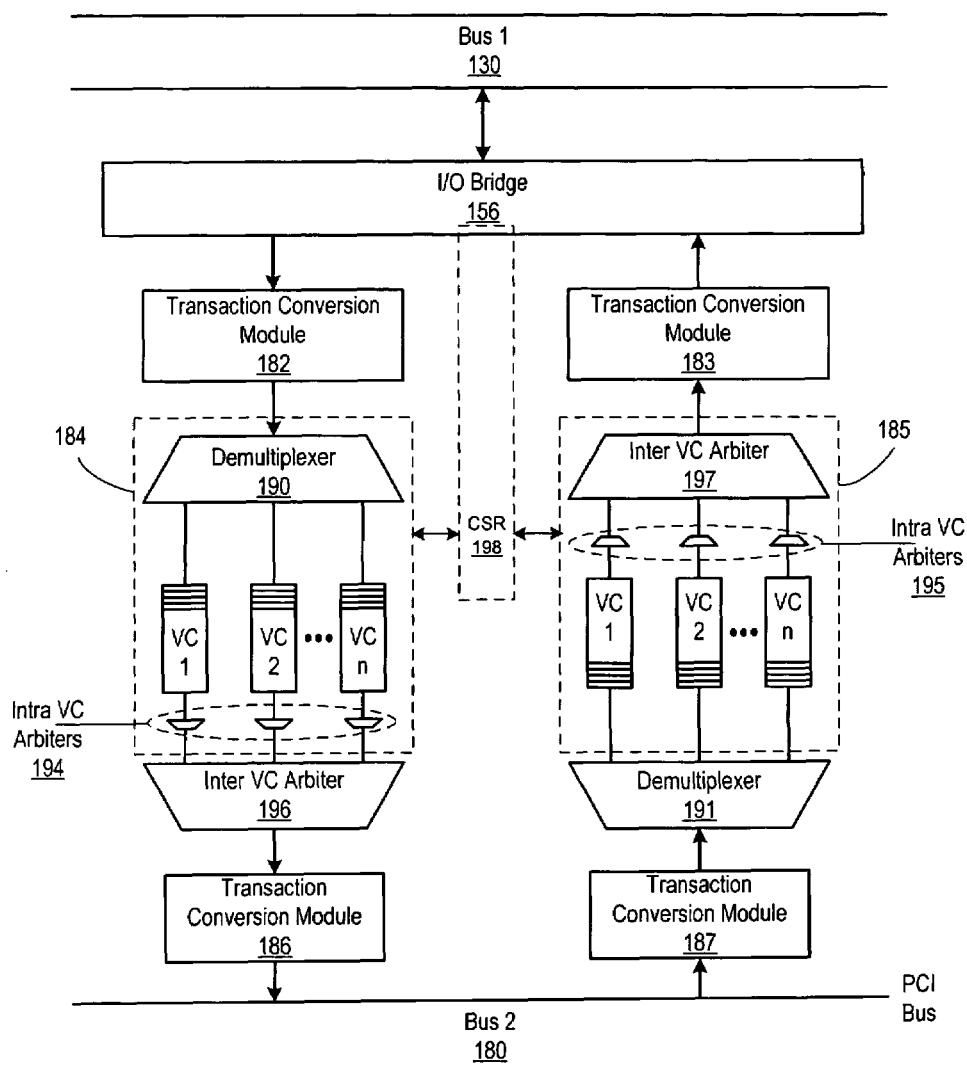
FIG. 3 is a functional block diagram of the programmable rules ordering logic system of the present invention.

Operation of the programmable rules ordering logic 184 and 185 of the present invention can be understood by referring to FIG. 3. Transactions from bus 130 to bus 180 are managed by rules ordering logic 184 which comprises a demultiplexer 190 that is operable to direct transactions to a plurality of virtual channels VC1,VC2, . . . , VCn, as described in greater detail hereinbelow. Issuing of validated transactions within a particular virtual channel is controlled by a plurality of intra-virtual channel arbiters 194. Transactions selected and issued by the various intra-virtual channel arbiters 194 are received by an inter-virtual channel arbiter 196 that is operable to select particular validated transactions for transfer to the transaction conversion module 186. The functional components discussed in connection with the ordering rules logic modules 184 and 185 are programmable and are controlled by the configuration status register 198. Arbiters 194 and 196 are also programmable and their behavior is controlled by the data in the configuration status register 198. In an embodiment of the present invention, the configuration status register 198 resides within the I/O bridge 156.

When a transaction is received from bus 130 via the input/output bridge 156, it is converted from the format associated with bus 130 into an internal format for use by the rules ordering logic module 184. The transaction is time-stamped to determine its temporal order with respect to all other transactions and is directed by demultiplexer 190 to a virtual channel corresponding to its transaction type. For example, a "read" will be placed in a non-posted virtual channel. When the bus 180 is able to receive a transaction, each individual arbiter within the intra-virtual channel arbiters 194 will select a validated transaction, if it exists, to be issued from a particular virtual channel. The inter-virtual channel arbiter 196 then chooses a validated transaction from among all eligible transactions in the virtual channels and issues the selected transaction to the conversion module 186.

In various embodiments of the present invention, the intra-virtual channel arbiters 194 and the inter-virtual channel arbiter 196 are programmed by the configuration register 198 to choose validated transactions based on a plurality of protocols. In one embodiment of the invention, validated transactions are issued based on the time-stamp of the transaction, such that various transactions are issued on a first-in, first-out basis. In alternate embodiments, validated transactions may be issued randomly to maximize utilization of system resources.

Operation of the programmable rules ordering logic 185 of the present invention is substantially the same as discussed above in connection with rules ordering logic module 184. Transactions from bus 180 to bus 130 are managed by rules ordering logic 184 which comprises a demultiplexer 191 that is operable to direct transactions to a plurality of virtual channels VC1, VC2, . . . , VCn. Issuing of validated transactions within a particular virtual channel is controlled by a plurality of intra-virtual channel arbiters 195. Transactions selected and issued by the various intra-virtual channel arbiters 195 are received by an inter-virtual channel arbiter 197 that is operable to select particular validated transactions for transfer to the transaction conversion module 183. The functional components discussed in connection with the ordering rules logic modules 185 are programmable and are controlled by the configuration status register 198. Arbiters 195 and 197 are also programmable and their behavior is controlled by the data in the configuration status register 198.

When a transaction is received from bus 180, it is converted from the format associated with bus 180 into an internal format for use by the rules ordering logic module 185. When the bus 130 is able to receive a transaction, each individual arbiter within the intra-virtual channel arbiters 195 will select a validated transaction, if it exists, to be issued from a particular virtual channel. The inter-virtual channel arbiter 197 then chooses a validated transaction from among all eligible transactions in the virtual channels and issues the selected transaction to the conversion module 183.

In various embodiments of the present invention, the intra-virtual channel arbiters 195 and the inter-virtual channel arbiter 197 are programmed by the configuration register 198 to choose validated transactions based on a plurality of protocols. In one embodiment of the invention, validated transactions are issued based on the time-stamp of the transaction, such that various transactions are issued on a first-in, first-out basis. In alternate embodiments, validated transactions may be issued randomly to maximize utilization of system resources.

Rules for the validation of a particular transaction are based on inter-virtual channel matrices and intra-virtual channel dependency matrices, together with the time-stamp for the individual transactions. A particular transaction is validated only after it satisfies the conditions set forth in both the inter-virtual channel transaction dependency matrices and the respective intra-virtual channel transaction dependency matrices. If, however, a transaction does not have a dependency requirement, it is validated immediately.

FIG. 4 is an illustration of an inter-virtual channel transaction dependency matrix that can be used to determine when the various transactions can be issued with respect to other transactions queued in other virtual channels. The horizontal rows and the vertical columns in FIG. 4 illustrate the dependencies between the various virtual channels, VCi. A "Yes" entry at row X and column Y indicates that VCx is dependent on VCy. In other words, if a transaction Ty exists in VCy before a new transaction Tx arrives at VCx, Ty must be issued before Tx can be issued. Otherwise, there is no relationship between Tx and Ty. Each transaction Tx has its own dependency set S. If VCx does not have any "Yes" entries along its row in the inter-virtual channel transaction dependency matrix, set S is empty. Otherwise, if a Yes entry exists in column VCy (say) along row VCx, then for each existing entry I in virtual channel y, an ordered pair (y,I) will be added to set S. Ordered pairs are added to S until all "Yes" entries along row VCx have been covered. When and if entry I in virtual channel y has been issued, the corresponding ordered pair (y,I) will be removed from all sets S that contain it. When a set S of any transaction Tx is empty, Tx can be validated. In one implementation, each transaction Tv in a virtual channel V has a valid bit for every transaction in every virtual channel other than the virtual channel V in which transaction Tv resides. When a new transaction Tv arrives at virtual channel V, some (or none) of these valid bits may be set based on the dependency matrix that is currently programmed in the configuration status registers 198. In other words, the transaction Tv can be prioritized in accordance with a predetermined protocol, (PCI bus ordering rules) by setting and tracking the appropriate valid bits corresponding to transactions in other virtual channels. As each transaction that Tv "depends on" is issued on the second bus 180, the corresponding valid bit for each issued transaction is cleared. When all set valid bits for Tv are cleared, Tv can be validated. The "@" designation indicates an intra-virtual channel dependency is governed by the intra-virtual channel dependency matrix described below.

In the present invention, any inter- or intra-virtual channel dependency can be programmed at any time into the rules ordering logic modules 184 and 185 by writing to configuration registers 198. The level of programmability is implementation specific. This is different from prior art bus interfaces where dependency rules are usually hardwired and cannot be changed "on the fly." Hence, the IO bus interface using the ordering rules logic modules 184 and 185 of the present invention are very flexible and can be adapted to be used with many different bus standards.

For example, FIG. 5 is an example of an implementation for inter-virtual channels of a PCI bus. Referring to FIG. 5, it can be seen that for a PCI bus a response cannot be issued until all posted transactions previously queued up have been issued. In addition, a non-posted transaction cannot be issued until all posted transactions queued up before that transaction have been issued. In one implementation, (A) is hardwired while (B) is programmable through a configuration register.

FIG. 6 is an illustration of an intra-virtual channel transaction dependency matrix that is used to govern validation when a transaction queued inside a particular virtual channel can be issued with respect to each other in the same channel. In the matrix illustrated in FIG. 6, $C_i = i^{th}$ constraint. A "Yes" entry at row X and column Y indicates that Cx is dependent on Cy. In other words, if a transaction Ty with constraint Cy exists before a new transaction Tx with constraint Cx arrives in the same virtual channel, then Ty must be issued before Tx can be issued. Otherwise, there is no relationship between Tx and Ty. This matrix can be implemented in a similar way as the inter-virtual channel dependency matrix. A constraint Ci is any condition that may affect the order of instruction issuing within a virtual channel. In one embodiment of the invention, Ci can comprise types of instructions, sources of those instructions, targets of those instructions, and/or states of the system. Since all transactions are time-stamped, Ci does not include a time-stamp. The constraints used within a virtual channel can be independent of constraints used in another virtual channel.

FIG. 7 is an illustration of an embodiment of a dependency matrix illustrating the dependency relationship for the non-posted channel of a PCI transaction. As can be seen, an IO command from CPU must be ordered with respect to other IO commands from CPU. However, an IO command from CPU does not have any ordering dependency with respect to any other commands.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A system for managing data transactions between a first bus and a second bus, comprising:
    a first transaction conversion module operably coupled to said first bus, said first transaction conversion module being operable to receive transactions from said first bus in a first format and to convert said transactions into an internal format;
    a programmable ordering rules logic module operably coupled to said first transaction module to receive said converted transactions in said internal format and to control issuing of said transactions in accordance with a dependency relationship between individual converted transactions and further operable to issue validated transactions through a plurality of virtual channels using an inter-virtual channel arbiter and a plurality of intra-virtual channel arbiters; and
    a second transaction conversion module operably coupled to said ordering logic module and to said second bus, said second transaction conversion module being operable to convert said validated transactions into a second format for said second bus.

2. The system of claim 1, wherein transactions on said first bus are managed using a first set of ordering rules and transactions on said second bus are managed using a second set of ordering rules.

3. The system of claim 1, wherein said transactions comprise a time stamp and wherein said ordering rules logic module is operable to use said time stamp to issue said validated transactions.

4. The system of claim 3, wherein said rules logic module is operable to validate said transactions using a protocol based on an efficiency algorithm optimizing the availability of said second bus to accept a validated transaction.

5. The system of claim 4, wherein said ordering rules logic module is programmed by a configuration status register.

6. A method for managing data transactions between a first bus and a second bus, comprising:
    receiving a first transaction in a conversion module operably coupled to said first bus, said first transaction conversion module being operable to receive transactions from said first bus in a first format and to convert said transactions into an internal format;

receiving said converted transaction in a fully programmable ordering rules logic module operably coupled to said first transaction module;

using said ordering rules logic module to validate said converted transactions and to control issuing of validated transactions to a second transaction module in accordance with a dependency relationship between a plurality of transactions, wherein said validated transactions are issued through a plurality of virtual channels using an inter-virtual channel arbiter and a plurality of intra-virtual channel arbiters; and using a second transaction conversion module to convert said validated transactions into a second format for said second bus.

7. The method of claim 6, wherein transactions on said first bus are managed using a first set of ordering rules and transactions on said second bus are managed using a second set of ordering rules.

8. The method of claim 7, wherein said transactions comprise a time stamp and wherein said ordering rules logic module is operable to use said time stamp to issue said validated transactions.

9. The method of claim 8, wherein said rules logic module is operable to validate said transactions using a protocol based on an efficiency algorithm optimizing the availability of said second bus to accept a validated transaction.

10. The method of claim 9, wherein said ordering rules logic module is programmed by a configuration status register.

* * * * *